(12) United States Patent
Tomida

(10) Patent No.: US 11,379,160 B2
(45) Date of Patent: Jul. 5, 2022

(54) IMAGE FORMING APPARATUS AND NON-TRANSITORY COMPUTER READABLE MEDIUM STORING IMAGE FORMING PROGRAM CAPABLE OF PRINTING DATA OBTAINED FROM MOBILE TERMINAL DEVICE

(71) Applicant: FUJIFILM Business Innovation Corp., Tokyo (JP)

(72) Inventor: Munenori Tomida, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 204 days.

(21) Appl. No.: 16/442,557

(22) Filed: Jun. 17, 2019

(65) Prior Publication Data
US 2020/0004469 A1 Jan. 2, 2020

(30) Foreign Application Priority Data
Jun. 27, 2018 (JP) .............................. JP2018-122184

(51) Int. Cl.
G06F 15/00 (2006.01)
G06F 3/12 (2006.01)
G06K 1/00 (2006.01)

(52) U.S. Cl.
CPC .......... *G06F 3/1204* (2013.01); *G06F 3/1231* (2013.01); *G06F 3/1261* (2013.01); *G06F 3/1292* (2013.01)

(58) Field of Classification Search
CPC .... G06F 3/1204; G06F 3/1231; G06F 3/1261; G06F 3/1292

USPC ............................... 358/1.15, 1.14, 1.13, 1.1
See application file for complete search history.

(56) References Cited

U.S. PATENT DOCUMENTS

| 9,753,681 B2 | 9/2017 | Torii | |
| 10,949,662 B2* | 3/2021 | Kanada | G06K 9/6878 |
| 2011/0109934 A1* | 5/2011 | Lee | G06F 3/1237 |
| | | | 358/1.15 |
| 2016/0323478 A1* | 11/2016 | Tsutsumi | H04N 1/32101 |

FOREIGN PATENT DOCUMENTS

| JP | 2006252321 | 9/2006 |
| JP | 2015106344 | 6/2015 |
| JP | 2015152932 | 8/2015 |
| JP | 2016103862 | 6/2016 |

OTHER PUBLICATIONS

"Office Action of Japan Counterpart Application", dated Jan. 25, 2022, with English translation thereof, p. 1-p. 8.

* cited by examiner

*Primary Examiner* — Douglas Q Tran
(74) *Attorney, Agent, or Firm* — JCIPRNET

(57) ABSTRACT

An image forming apparatus includes an information obtaining unit that obtains storage destination information of print data managed by a mobile terminal device from the mobile terminal device, a data obtaining unit that obtains the print data from a storage destination of the print data by using the storage destination information, and a printing unit that prints the obtained print data.

8 Claims, 6 Drawing Sheets

FIG. 3

| FILE No | OBTAINMENT INFORMATION | | | | PRINT SETTING INFORMATION |
|---|---|---|---|---|---|
| | STORAGE DESTINATION URL | COMMUNICATION PATH | PUBLIC KEY INFORMATION | PROXY INFORMATION | |
| 1 | file:///storage/emulated/0/Pictures/00001.jpg | Wi-Fi | xyzxyzxyz | null | COLOR: FULL COLOR, SHEET: A4, Nup: NONE, DOUBLE-SIDED PRINTING: NONE |
| 2 | https://docs.google.com/uc?export=view&id=1234567890abcdefghijklmnopqrb | INTERNET | null | PROXY A | COLOR: FULL COLOR, SHEET: A3, Nup: 4up, DOUBLE-SIDED PRINTING: LONG-EDGED BINDING |
| ⋮ | ⋮ | ⋮ | ⋮ | ⋮ | |

IMAGE FORMING APPARATUS AND NON-TRANSITORY COMPUTER READABLE MEDIUM STORING IMAGE FORMING PROGRAM CAPABLE OF PRINTING DATA OBTAINED FROM MOBILE TERMINAL DEVICE

CROSS-REFERENCE TO RELATED APPLICATIONS

This application is based on and claims priority under 35 USC 119 from Japanese Patent Application No. 2018-122184 filed Jun. 27, 2018.

BACKGROUND

(i) Technical Field

The present invention relates to an image forming apparatus, a non-transitory computer readable medium storing an image forming program, and a mobile terminal device.

(ii) Related Art

JP2015-106344A discloses a technology in which image data read by an image reading apparatus is transmitted to a smartphone. In this technology, a reading start instruction and a transmission destination information with which the read image data is transmitted to the smartphone are transmitted to the image reading apparatus from the smartphone. The image reading apparatus reads an image, and transmits the read image data to the smartphone based on the transmission destination information. The smartphone and the image reading apparatus communicate with each other through wireless LAN.

JP2016-103862A describes an image forming apparatus capable of performing short-distance wireless communication with a smartphone, such as NFC. In a case where the smartphone is recognized through the NFC, the image forming apparatus displays a setting screen such as a printing job on the smartphone through the NFC. A user performs a job setting by operating the smartphone, and transmits the job setting to the image forming apparatus through the NFC. Accordingly, the image forming apparatus performs processing according to the transmitted job setting.

JP2006-252321A describes an image forming apparatus connected to the Internet. Image data desired to be printed or print setting information is registered in another apparatus in advance, and a registration ID is input on an operation screen of the image forming apparatus. The image data or the print setting information corresponding to the registration ID is downloaded, and thus, printing is performed.

SUMMARY

A mobile terminal device such as a smartphone stores data such as image data or document data within the mobile terminal device. However, only outline information of the data may be stored within the mobile terminal device, and data entity may be stored in a server connected to a network. In a case where print data is selected from such data items in the mobile terminal device and the printing is performed in the image forming apparatus, since an access mode to the print data is changed depending on a difference storage destination, a situation in which an operation for transmitting the print data to the image forming apparatus is complicated is considered.

Aspects of non-limiting embodiments of the present disclosure relate to an image forming apparatus, a non-transitory computer readable medium storing an image forming program, and a mobile terminal device which resolve or reduce a situation in which an image forming apparatus is difficult to or is not able to obtain and print print data depending on a difference between storage destinations of print data in a case where print data selected in a mobile terminal device is printed in an image forming apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including an information obtaining unit that obtains storage destination information of print data managed by a mobile terminal device from the mobile terminal device, a data obtaining unit that obtains the print data from a storage destination of the print data by using the storage destination information, and a printing unit that prints the obtained print data.

BRIEF DESCRIPTION OF THE DRAWINGS

Exemplary embodiment(s) of the present invention will be described in detail based on the following figures, wherein:

FIG. 3 is a diagram showing an example of print information;

DETAILED DESCRIPTION

1. Description of System Configuration

Hereinafter, a system according to an exemplary embodiment on the assumption that a printing service provided by a convenience store is used by a user who visits the convenience store will be described. In the convenience store, a multi-function printer is installed and a service such as printing is provided to a large number of unspecified users who visit the convenience store for a fee in some cases.

Figure 1:
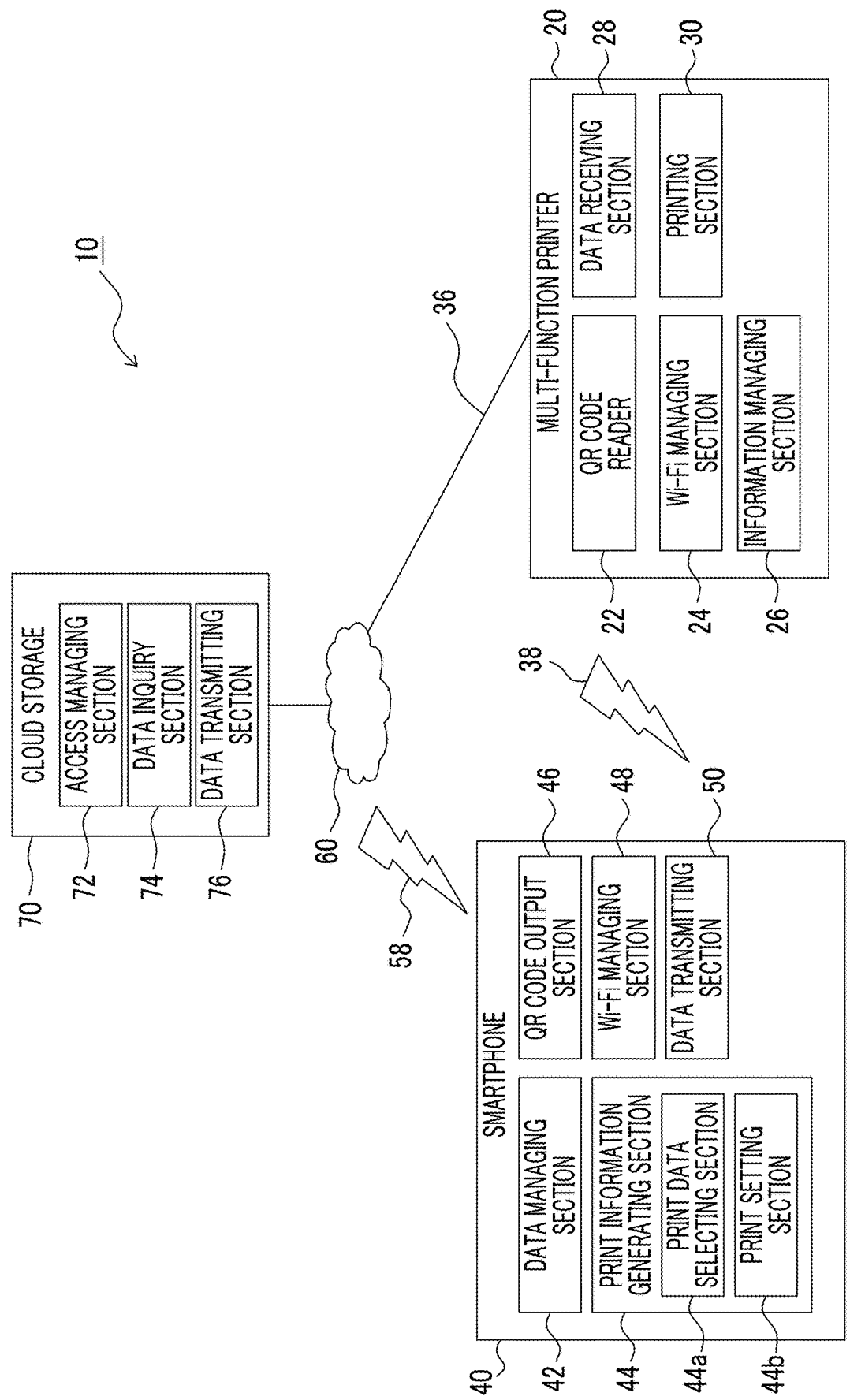
FIG. 1 is a diagram showing a configuration example of a printing system according to an exemplary embodiment.

A printing system 10 shown in FIG. 1 includes a multi-function printer 20, a smartphone 40, the Internet 60, and a cloud storage 70. The multi-function printer 20 is an example of an image forming apparatus, and is installed in the convenience store. The smartphone 40 is an example of a mobile terminal device, and is owned by the user. The Internet 60 and the cloud storage 70 connected to the Internet are respectively examples of a network and a storage destination connected to the network. Each of these configurations has various functions, and FIG. 1 shows an outline of a functional configuration deeply related to the exemplary embodiment.

The multi-function printer 20 is a complex machine having a print function, a scan function, a copy function, an electronic mail function, and a Fax function. The multi-function printer 20 is configured by controlling hardware including a printing apparatus, a communication device, and various sensors by using computer hardware and software (programs). The multi-function printer 20 includes a QR code reader 22, a Wi-Fi managing section 24, an information managing section 26, a data receiving section 28, a printing section 30, and a communication cable 36.

The QR code reader 22 is an example of an information obtaining unit. The QR code reader optically reads and analyzes a QR code (registered trademark), and decodes print information including obtainment information and print setting information of print data encoded as the QR code. The QR code is a two-dimensional code (two-dimensional image) standardized such that data with a maximum of about several kilobytes is able to be rendered to image information. The QR code is not able to contain the print data due to a small recordable capacity, but is able to transfer data with a small quantity such as the print information. In a case where a user wants to print with the multi-function printer 20, the user displays a QR code representing print information including the obtainment destination information and print setting information on a screen of the smartphone 40, and presents the displayed QR code to the QR code reader 22.

The Wi-Fi managing section 24 activates or deactivates Wi-Fi which is one kind of wireless communication standards. The multi-function printer 20 includes a Wi-Fi antenna therein or in the periphery. The Wi-Fi managing section 24 activates Wi-Fi, and thus, an access point which is a Wi-Fi connection is installed. In a case where it is necessary to perform Wi-Fi communication with the smartphone 40, the Wi-Fi managing section 24 is connected to the smartphone by activating the Wi-Fi and installing an access point specified by a service set identifier (SSID). In a case where it is not necessary to perform the communication, the Wi-Fi managing section deactivates the Wi-Fi. There is a plurality of Wi-Fi standards, but any of these standards is designed such that data with a large quantity such as document data and image data as printing target is smoothly transmitted and received.

The information managing section 26 manages the print information including the obtainment destination information and the print setting information obtained from the QR code. In order to obtain the print data corresponding to the obtainment destination information, the information managing section manages the connection with the Internet 60 and the cloud storage 70 through the communication cable 36 or the communication with the smartphone 40 through Wi-Fi 38.

The data receiving section 28 is an example of a data obtaining unit, and obtains the print data under of the information managing section 26. In a case where the print data is stored in the cloud storage 70, the data receiving section 28 obtains the print data from the cloud storage 70 through the communication cable 36. In a case where the print data is stored in the smartphone 40, the data receiving section 28 obtains the print data from the smartphone 40 through the Wi-Fi 38. For example, print data described in predetermined language and image format, such as the Portable Document Format (PDF) is received as the print data.

The printing section 30 is an example of a printing unit, and prints an image corresponding to the print data on a sheet. In printing, a setting for the number of sheets to be printed, a setting for a sheet size, a setting for single-sided printing or double-sided printing, and a setting for monochrome printing or color printing are performed according to the print setting information managed by the information managing section 26.

The communication cable 36 is a communication path established by using an optical fiber. The communication cable 36 may be directly connected to the Internet 60. Alternatively, the communication cable 36 may be connected to an intranet established by an installer of the multi-function printer 20. In this case, the multi-function printer 20 may be connected to the Internet 60 through a proxy server that connects the intranet and the Internet 60 with each other.

The smartphone 40 is able to perform various information processing or communication processing by controlling hardware having an arithmetic function and a communication function by using installed operating system and applications. The smartphone is provided with a touch panel display, and has a function of displaying a still image or a moving image and receiving a user operation corresponding to the display. For example, user operations according to the exemplary embodiment or various information processing and communication processing corresponding to the user operations are realized by creating and installing a print application having various functions as mentioned above or by using a web browser having such functions as a user interface.

As shown in FIG. 1, the smartphone 40 includes a data managing section 42, a print information generating section 44, a QR code output section 46, a Wi-Fi managing section 48, and a data transmitting section 50.

The data managing section 42 manages the storage destination of the data in the smartphone 40. Data entity may be stored in a storage device (local storage destination) (not shown) included in the smartphone 40 or may be stored in the cloud storage 70 (the storage destination connected to the Internet 60). The data managing section 42 appropriately manages the data by transmitting the data to the cloud storage 70 or downloading the data from the cloud storage 70. The management of the data is performed by associating data information (size, file type, creation date and time, and thumbnail image) including whether or not there is data (which is able to be generally described in a Uniform Resource Locator (URL) using a https scheme or a file scheme, but is able to be described in another format) with the data entity. Thus, the user generally uses the data without being conscious of whether the data entity is present in the smartphone 40 or the cloud storage 70.

The print information generating section 44 generates print information related to printing. The print information generating section 44 includes a print data selecting section 44a and a print setting section 44b. The print data selecting section 44a is an example of a selection unit, and sets data, as the print data, which is selected by the user who is operating the touch panel. The print setting section 44b performs a print setting indicating a method of printing the print data. For example, the print setting section 44b performs a setting for the number of sheets to be printed, a setting for a sheet size, a setting for an orientation of a sheet, a setting for single-sided printing or double-sided printing, a setting for monochrome printing or color printing, and a setting for the number of pages to be printed on one sheet. The print setting section 44b receives the contents of the print setting selected by the user who is operating the touch panel (or default setting values), and performs the print setting.

The print information generating section 44 generates the print information based on the settings for the print data using the print data selecting section 44a and the print setting using the print setting section 44b. The print information includes the obtainment information and the print setting information of the print data. The obtainment information is information necessary to obtain the print data from the storage destination. The obtainment information includes authentication information necessary in a case where the access to the print data is restricted in addition to storage destination information specified by a URL. The print setting information is information that describes the contents of the aforementioned print setting, and is used for controlling the printing in the printing section 30 of the multi-function printer 20.

The QR code output section 46 is an example of a transmission unit. The QR code output section converts the print information into the QR code, and displays the QR code on the touch panel display. For example, the user displays the QR code by pressing a predetermined button on the print application. The print information is transmitted to the multi-function printer 20 by reading the QR code into the QR code reader 22 of the multi-function printer 20.

The Wi-Fi managing section 48 controls the connection or disconnection with or from a connection destination connected to the Wi-Fi. Specifically, the Wi-Fi managing section identifies the SSID of the access point by detecting radio waves output from the access point. The Wi-Fi managing section switches the connection destination connected to the Wi-Fi so as to be connected to the searched connection destination in addition to searching for the SSID as a connecting candidate. For example, in a case where the QR code of the print information is read into the QR code reader 22 of the multi-function printer 20, since the Wi-Fi managing section 24 activates the Wi-Fi, the multi-function printer 20 detects the SSID, and is able to be connected to the connection destination. In a case where the data entity is stored in the cloud storage 70 or the data entity stored in the cloud storage 70 is downloaded, the Wi-Fi managing section detects an SSID for accessing to the Internet 60 different from the SSID of the multi-function printer 20, and is connected to the Internet 60.

In a case where the entity of the print data is stored in the smartphone 40, the data transmitting section 50 transmits the print data to the multi-function printer 20. The transmission of the print data to the multi-function printer 20 is performed through the Wi-Fi 38.

The Internet 60 is a globally established network, and is able to be accessed by the smartphone 40. The cloud storage 70 is a file server connected to the Internet 60. The cloud storage 70 may be installed by a communication carrier or a manufacturer of the smartphone 40 or may be installed by a third party. The cloud storage 70 may be established by one device or may be established by cooperating a plurality of devices connected to the Internet 60.

The cloud storage 70 includes an access managing section 72, a data inquiry section 74, and a data transmitting section 76. The access managing section 72 manages the access to the cloud storage 70 or the Internet 60. Specifically, an authentication process in a case where the access is performed from the multi-function printer 20 is performed. In a case where an inquiry about the print data is received from the multi-function printer 20, the data inquiry section 74 responds as to whether or not there is the print data. The data transmitting section 76 transmits the print data to the multi-function printer 20.

2. Description of Operation

Figure 2:
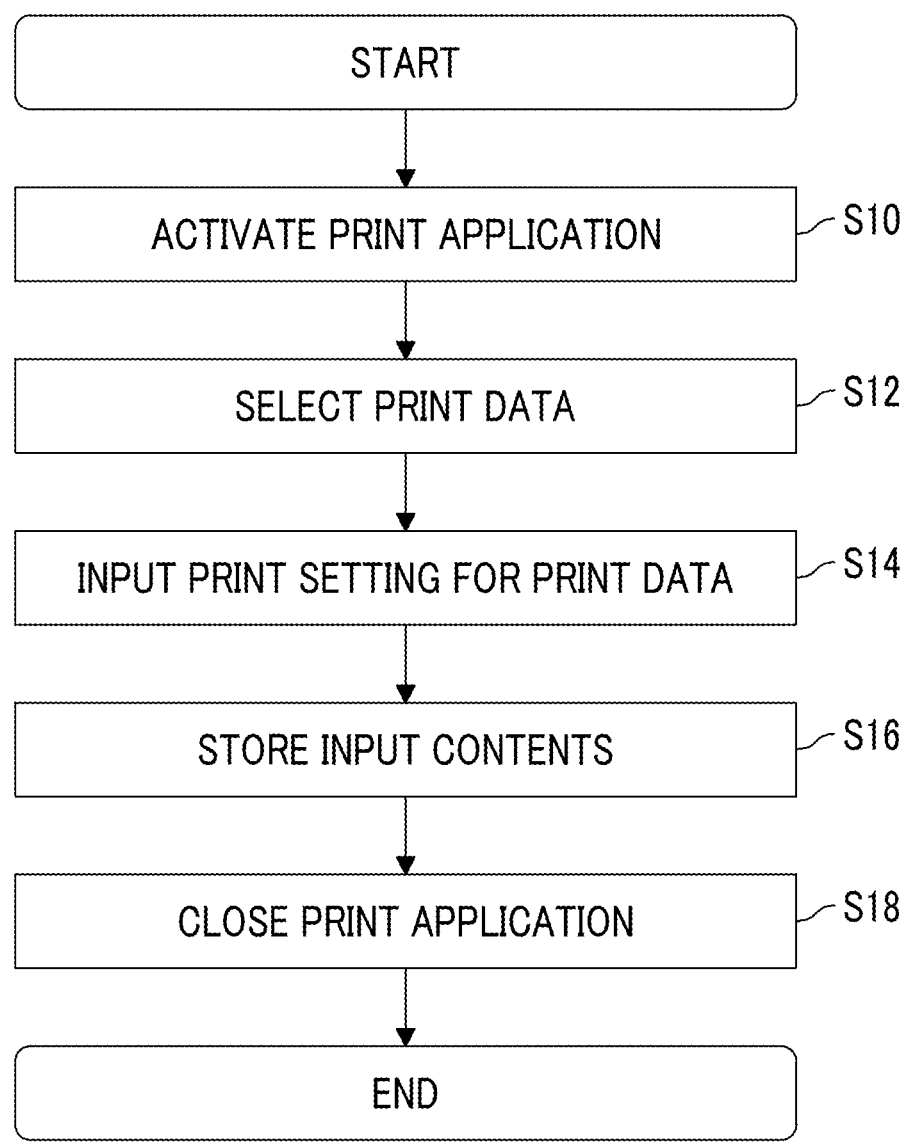
FIG. 2 is a flowchart showing a print data selecting procedure of a smartphone.

An operation of the printing system 10 will be described with reference to FIGS. 2 to 8. FIG. 2 is a flowchart showing a procedure in a case where the user activates the print application on the smartphone 40 and performs the setting for the printing. In a case where the user wants to print a photo captured by the smartphone 40 or a document managed by the smartphone 40, the user activates the print application (S10). Information for prompting the user to select printing target data is displayed on the print application, and the user selects data desired to be printed among various data items managed by the smartphone 40 (S12). For example, the data is selected in such a manner that the user opens a folder of photos or documents and touches desired data. The data entity may be stored in the smartphone 40 or may be stored in the cloud storage 70. In the present exemplary embodiment, the user may select the print data without being particularly conscious of the storage destination. The process related to the selection of the print data is performed by the print data selecting section 44a.

Subsequently, the user inputs the print setting for the print data (S14). In performing the settings, the default values may be used or may be changed to desired values from the default values. The process related to the print setting is performed by the print setting section 44b.

The user may immediately perform an operation for instructing the printing in this state. However, in a case where the user performs the print setting at home or outdoors and the multi-function printer 20 is not present in the vicinity, the user stores the input contents (S16), and closes the print applications (S18). In the print application, the print information generating section 44 stores the input contents as the print information. The print application may further have a function of receiving and storing a print setting of another print data. The user selects the print data and performs the print setting before the printing, and thus, there is an advantage that an operation performed before the multi-function printer 20 is simple.

Now, the stored print information will be described with reference to FIG. 3. The obtainment information includes a storage destination URL, a communication path, public key information, and proxy information. The storage destination URL is an example of the storage destination information of the print data, and indicates a storage destination in which the print data is stored. For example, a storage destination URL of print information of which a file No is 1 as shown in FIG. 3 describes "file:///storage/emulated/0/Pictures/00001.jpg" by using a URL file scheme. In this example, the file scheme indicates that the print data is stored in the smartphone 40, and describes that print data in a JPG image format of "00001.jpg" is present in a directory (folder) indicated by an absolute path of "/storage/emulated/0/Pictures". A storage destination URL of print information of which a file No is 2 describes "http://docs.google.com/uc?export=view&id=1234567890abcdefghijklmnopqrb" by using a https scheme. In this example, the https scheme indicates that the communication protocol is encrypted using SSL/TLS and communication using HTTP is performed, and "docs.google.com/uc" indicates a host name and a path name. Arguments given variables of "export" and "id" are described after "?".

In a case where the multi-function printer 20 obtains the print data, the communication path indicates a communication path to be used. In a case where the file No is 1, since the print data is stored in the smartphone 40, the communication path indicates that Wi-Fi communication established between the smartphone 40 and the multi-function printer. In the example in which the file No is 2, the communication path indicates that the print data is to be obtained from the Internet.

The public key information is information of a public key necessary in a case where the print data is obtained. The proxy information indicates information of a proxy necessary in a case where the print data is obtained. In a case where these information items are unnecessary, a value of null is set.

The print setting information is information indicating a printing mode in a case where the print data is printed in the multi-function printer 20. For example, in the example in which the file No is 1, "full color" is set for "color", a size of "A4" is set for "sheet", "None" (one page is printed on one sheet) is set for "Nup", and "None" (single-sided printing) is set for "double-sided printing".

The print information illustrated in FIG. 3 is used to be presented to the multi-function printer 20, and is also used in the processes of the smartphone 40. Thus, the print information may include information which is not used in the multi-function printer 20. The print information may further include information to be presented to the user, such as print fee.

Figure 4:
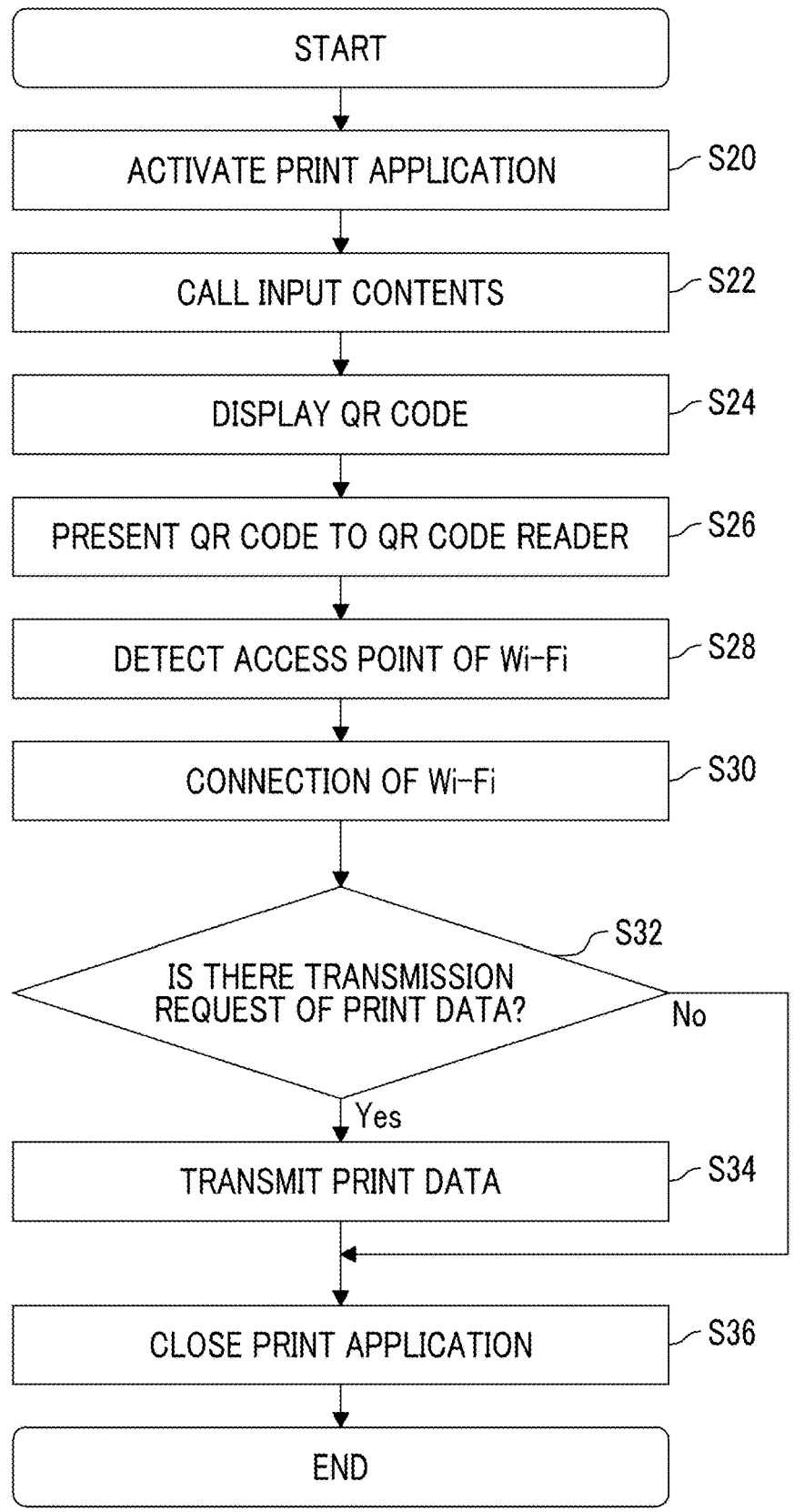
FIG. 4 is a flowchart showing a transmission procedure of the print information of the smartphone.

FIG. 4 is a flowchart for describing a procedure of transmitting the print data to the multi-function printer 20 from the smartphone 40. In this example, it is assumed that the user visits the convenience store after some time elapses from when the procedure shown in FIG. 2 is performed and performs the printing.

The user initially activates the print application by operating the smartphone 40 (S20), and calls the input contents stored for print data desired to be printed (S22). In this case, the print application displays the previous input contents on the screen based on the print information shown in FIG. 3. The user displays the QR code obtained by encoding the print information by pressing a button according to a guidance of the print application (S24). The QR code is displayed by the QR code output section 46. The multi-function printer 20 installed in the convenience store displays a guidance to the user such that the user places the QR code over the QR code reader 22. The user presents the QR code to the QR code reader 22 according to the guidance (S26).

Thereafter, the print application of the smartphone 40 detects the access point (the SSID of the Wi-Fi 38) due to the activation of the Wi-Fi 38 of the multi-function printer 20 (S28). In a case where the access point of the multi-function printer 20 is detected, the print application automatically accesses to the access point, and performs the connection of the Wi-Fi 38 (S30). The detection and connection of the access point of the Wi-Fi 38 are performed under the control of the Wi-Fi managing section 48.

After the connection of the Wi-Fi 38, the smartphone 40 waits for a transmission request of the print data is transmitted (S32). In a case where there is the transmission request, the smartphone automatically transmits the print data to the multi-function printer 20 through the Wi-Fi 38 (S34). The transmission of the data is performed by the data transmitting section 50. Thereafter, the print application is closed automatically or by an operation of the user at an appropriate timing (S36).

As stated above, the connection of the Wi-Fi 38 and the transmission of the print data are automatically performed, and thus, the user may transmit the print data without performing a cumbersome operation. However, a button for prompting the user to permit the connection of the Wi-Fi or the transmission of the print data is displayed before the connection of the Wi-Fi 38 or the transmission of the print data, and thus, the connection of the Wi-Fi or the transmission of the print data may be performed in a case where the user presses the button. In this case, the user may smoothly transmit the print data by operating the print application according to the displayed information.

It has been described in the exemplary embodiment shown in FIG. 4 that the connection of the Wi-Fi 38 is performed in a case where the access point of the Wi-Fi 38 is detected in steps S28 and S30. However, as described with reference to FIG. 5, the transmission of the print data is not necessary in a case where the print data is stored in the cloud storage 70. Accordingly, the connection of the Wi-Fi 38 may be performed only in a case where the print data is stored in the smartphone 40.

Figure 5:
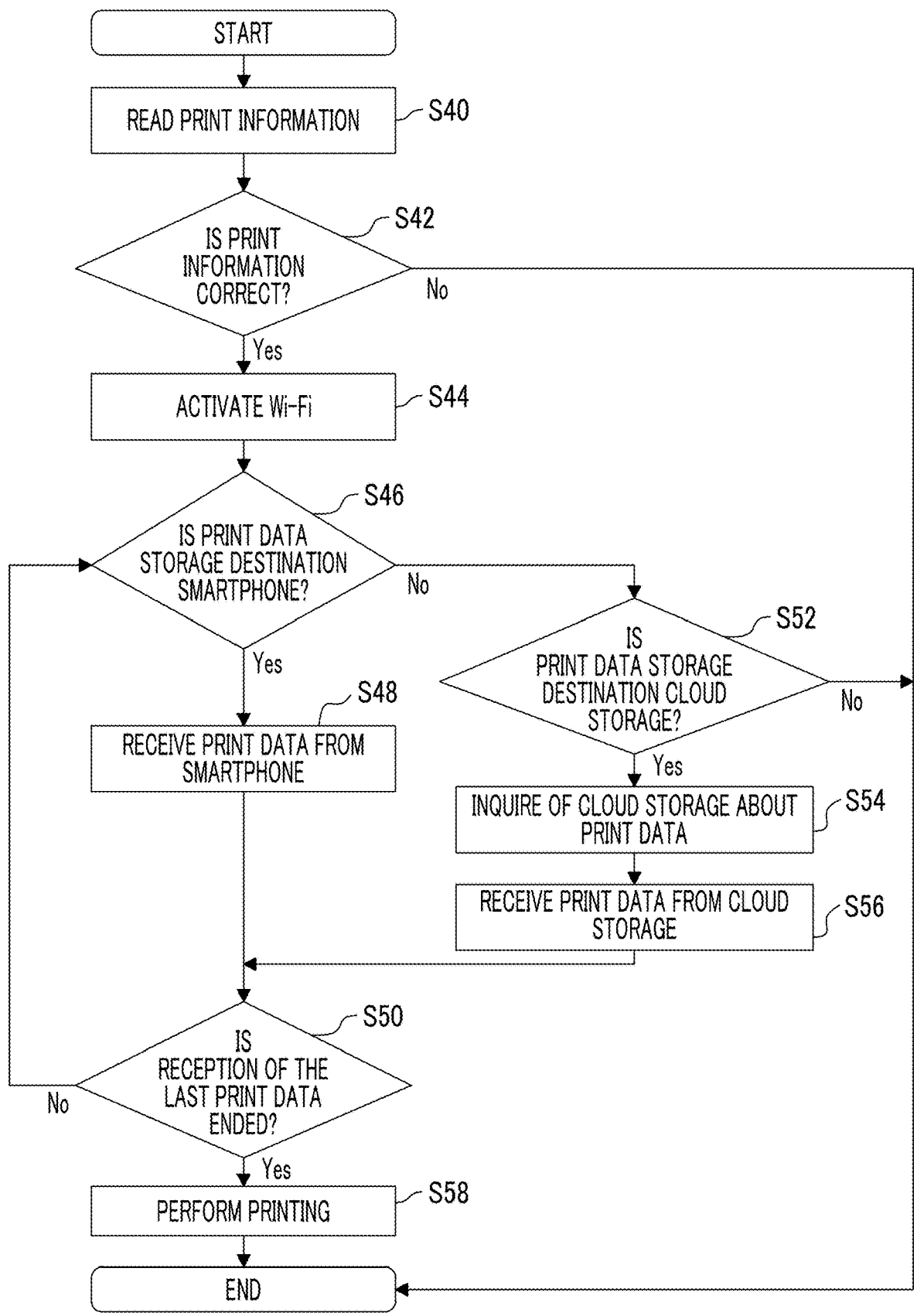
FIG. 5 is a flowchart showing a print data obtaining procedure of a multi-function printer.

FIG. 5 is a flowchart showing processes performed by the multi-function printer 20 in the procedure shown in FIG. 4. In a case where the user presents the QR code of the smartphone 40 to the QR code reader 22, the multi-function printer 20 optically reads the QR code, decodes the code, and obtains the print information (S40). The multi-function printer determines the validity of the read print information (S42), and ends the process in a case where the read print information is invalid. For example, the read print information being invalid means that information completely different from the processing contents in the multi-function printer 20 is input or information having no input contents is input. Meanwhile, the processing is continued in a case where the print information is valid, and the Wi-Fi managing section 24 activates the Wi-Fi 38 (S44). Accordingly, the smartphone 40 detects the access point for accessing to the multi-function printer 20, and performs the connection with the Wi-Fi 38.

In the multi-function printer 20, the information managing section 26 checks whether or not the storage destination of the print data is the smartphone 40 while referring to the storage destination URL of the obtainment information of the print information (S46). In a case where the storage destination is the smartphone 40, the multi-function printer obtains the print data based on the obtainment information (S48). Specifically, the multi-function printer requests the smartphone 40 to transmit the print data indicated by the storage destination URL through Wi-Fi 38, and receives the print data from the smartphone 40. The data is received by the data receiving section 28. Since a plurality of print data items may be included in the print information, the multi-function printer determines whether or not the reception of the last print data is ended (S50), and returns to step S46 and continues the process in a case where there is the remaining print data item.

In step S46, in a case where the storage destination of the print data is not the smartphone 40, the multi-function printer determines whether or not the storage destination of the print data is the cloud storage 70 (S52). In a case where the print data is not stored in the cloud storage 70, since the multi-function printer 20 is not able to cope with in the current example, the process is ended. Meanwhile, in a case where the print data is stored in the cloud storage 70, the multi-function printer inquires of the cloud storage 70 about the print data through the Internet 60 based on the obtainment information (S54). In a case where the print data is present, the multi-function printer receives the print data from the cloud storage 70 (S56).

After the multi-function printer 20 obtains the print data, the printing section 30 performs the printing according to the print setting information (S58). The multi-function printer 20 may present the print fee to the user before the printing is started, and may perform a process of requesting payment. The multi-function printer 20 may start the printing after the user presses a print start button on an operation screen of the multi-function printer 20.

The multi-function printer 20 activates the Wi-Fi in step S44, but does not perform the communication using the Wi-Fi in a case where the multi-function printer determines that the print data is not stored in the smartphone 40 in step S46. Accordingly, the multi-function printer may not activate the Wi-Fi in step S44, and may activate the Wi-Fi after the multi-function printer determines that the print data is stored in the smartphone 40 in step S46.

Figure 6:
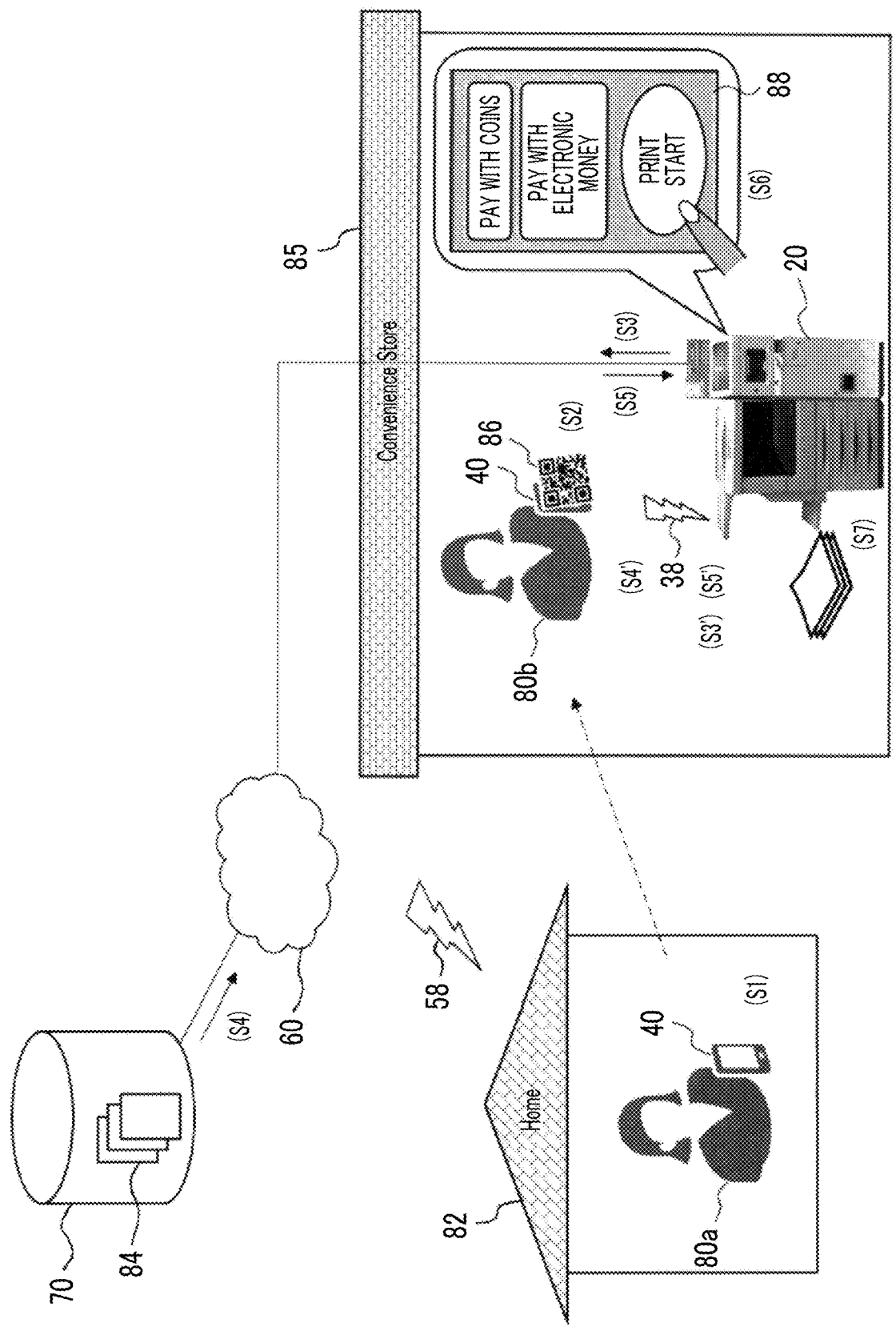
FIG. 6 is a schematic diagram showing a flow from when print data is selected to when the print data is printed.

Now, the overall image according to the exemplary embodiment will be described with reference to FIG. 6. FIG. 6 is a diagram for describing a flow from when the print data is selected to when the print data is printed.

In the lower part on the left side of FIG. 6, a case where a user 80a operates the smartphone 40 in home 82 is illustrated. The smartphone 40 is generally connected to the Internet 60 through Wi-Fi 58, and is able to easily access to the cloud storage 70. Thus, the data entity managed by the smartphone 40 may be stored in the cloud storage 70.

In a case where the user 80a wants to print the data managed by the smartphone 40, the user activates the print application, selects the print data, and performs the print setting for the print data (S1). In the illustrated example, it is assumed that a file 84 of which data entity is stored in the cloud storage 70 is set as the print data. In this case, the user 80a is not generally conscious of the storage destination of the file 84. In a case where the print data is set, the print application does not download the file 84 to the smartphone 40. Many data items are stored in the cloud storage 70, and thus, it is possible to reduce the storage capacity of the smartphone 40. The print application according to the present exemplary embodiment is designed to proceed with the printing while maintaining a file storage destination.

Thereafter, a user 80b who goes to a convenience store 85 activates the print application again on the smartphone 40. The user displays the QR code indicating the print information related to the previously selected print data on the screen (S2). The user presents the QR code to the QR code reader of the multi-function printer 20 installed in the convenience store, and thus, the print information is transmitted to the multi-function printer 20.

The multi-function printer 20 recognizes that the print data is stored in the cloud storage 70 connected to the Internet 60 while referring to the obtainment information included in the print information, and requests the cloud storage to transmit the print data (S3). The cloud storage 70 transmits the print data according to the request (S4). Accordingly, the multi-function printer 20 may receive the print data (S5).

In a case where the print data is stored in the smartphone 40, the multi-function printer 20 requests the smartphone 40 to transmit the print data through the Wi-Fi 38 (S3'). The smartphone 40 transmits the print data to the multi-function printer 20 through the Wi-Fi 38 (S4'), and the multi-function printer 20 receives the print data (S5').

After the reception of the print data, the multi-function printer 20 prepares printing based on the print setting information, presents a printing fee to a touch panel display 88, and prompts the user 80b to pay the printing fee. In the example of FIG. 6, the user presses a button of "pay with coins" or "pay with electronic money", and pays the printing fee. Ultimately, in a case where the user 80b presses a button of "print start" (S6), the print data is printed (S7).

3. Modification Examples

The exemplary embodiment may be variously modified within the scope of the present invention. For example, it has been described that in a case where the print data is stored in the smartphone 40, the multi-function printer requests the smartphone 40 to transmit the print data and receives the print data. However, it can be seen that the smartphone 40 needs to transmit the print data by referring to the print information even though the smartphone does not receive the transmission request from the multi-function printer 20. In a case where the print data is stored in the smartphone 40, the multi-function printer 20 may not request the smartphone 40 to transmit the print data. In this case, the smartphone 40 may voluntarily transmit the print data to the multi-function printer 20 after the smartphone is connected to the Wi-Fi 38.

In the aforementioned description, it is assumed that the multi-function printer 20 may access to the cloud storage 70 without performing special authentication and may receive the print data. However, in order to increase the security of the data managed by the smartphone 40, an example in which the cloud storage 70 performs authentication for the access so as not to be accessed by a third party is considered. Thus, the smartphone 40 adds authentication information such as a password necessary for the authentication to the obtainment information. Accordingly, the smartphone 40 transmits the password to the cloud storage 70, and may obtain access authority.

For example, it is considered that the cloud storage 70 more strictly restricts the access like a case where the cloud storage does not permit a device different from the smartphone 40 to access. In this case, the multi-function printer 20 is not able to obtain the print data from the cloud storage 70. Thus, in a case where the multi-function printer 20 is not able to obtain the print data from the cloud storage 70, the multi-function printer 20 may instruct the smartphone 40 to transmit the print data from the smartphone 40 to the multi-function printer 20 through the Wi-Fi 38. The smartphone 40 that receives the instruction obtains the print data from the cloud storage 70, and transmits the obtained print data to the multi-function printer 20. This mode is an example of data obtainment using a data obtaining unit of the mobile terminal device.

In a case where secret information such as a password is obtained from the smartphone 40, the cloud storage 70 does not perform the analysis of the password or performs a process of promptly deleting the password after the password is used. Thus, it is possible to restrain a situation such as a secret leakage. It is also considered that reliability from the user is increased by establishing and publishing a security policy.

It has been described that the smartphone 40 transmits and receives the data to and from the cloud storage 70 or the multi-function printer 20 by using the Wi-Fi. However, the smartphone 40 may generally use a communication standard for mobile devices, such as Long Term. Evolution (LTE) in addition to the Wi-Fi. For example, the smartphone may transmit the print data to the multi-function printer 20 by using wireless communication of the communication standard such as LTE instead of the Wi-Fi. The smartphone may transmit the print data to the multi-function printer 20 by performing communication using a wireless communication standard that assumes a short distance, such as Bluetooth (registered trademark) as long as a practical communication speed is able to be secured.

It has been described that the print information is transmitted to the multi-function printer 20 from the smartphone 40 by using the QR code. However, the print information may be transmitted through the wireless communication instead of transmitting the image information such as the QR code. Specifically, an example in which near-field communication (NFC) or Bluetooth which is a wireless communication standard for short distances is used is illustrated. Of course, the same communication as the communication in the transmission of the print data, such as Wi-Fi or LTE, may be performed.

4. Summarization of Disclosure Matters

The image forming apparatus according to the exemplary embodiment includes an information obtaining unit, a data obtaining unit, and a printing unit. The image forming apparatus is an apparatus having a function of printing on a printing medium such as a sheet based on the print data. The image forming apparatus may further include a scanning unit, an FAX transmitting and receiving unit, and a mail transmitting and receiving unit.

The information obtaining unit obtains storage destination information of print data managed by a mobile terminal device from the mobile terminal device. The mobile terminal device is a device capable of being easily carried by a user. Examples of the mobile terminal device include a smartphone, a tablet, a portable personal computer (PC), and a multi-function mobile phone. The print data is data to be printed. The data to be printed is generally used in a format called a file. In the present specification, data and a file are described as the substantially same meaning, and print data and print file are also described as the substantially same meaning. The information obtaining unit obtains storage destination information indicating a storage destination in which the print data is stored. For example, a description format that specifies a storage destination a file name of the file, such as a Uniform Resource Locator (URL) may be used as the storage destination information. The storage destination information may be information that specifies a storage destination by inquiring of the storage destination or a server other than the storage destination and using information stored in the inquiry destination.

The data obtaining unit obtains the print data from the storage destination of the print data by using the storage destination information. For example, the data obtaining unit obtains the print data from the storage destination by requesting the storage destination to transmit the print data by using the storage destination information. Alternatively, the data obtaining unit may ultimately obtain the print data from the storage destination by requesting an appropriate server other than the storage destination to transmit the print data by using the storage destination information. In any case, the data obtaining unit does not merely wait until the print data is received, and actively obtains the print data by using the storage destination information.

The printing unit prints the obtained print data. That is, the printing unit prints on a printing medium such as a sheet based on the print data. The communication methods used by the information obtaining unit and the data obtaining unit are not particularly limited. Various methods such as wireless communication, optical communication, infrared communication, and communication using sound waves may be used.

In the image forming apparatus according to the exemplary embodiment, the print data includes data stored in a storage destination connected to a network accessible by the mobile terminal device, and the data obtaining unit is connected to the network and obtains the print data from the storage destination in a case where the print data is stored in the storage destination. Examples of the network accessible by the mobile terminal device include various networks such as an intranet provided by a manufacturer of the mobile terminal device and an intranet provided by a manufacturer of the image forming apparatus in addition to the Internet.

In the image forming apparatus according to the exemplary embodiment, the print data is data for which access is restricted, the information obtaining unit obtains authentication information necessary for accessing to the print data, and the data obtaining unit obtains the print data from the storage destination by using the authentication information. Examples of the authentication information necessary for accessing the print data include a password, a token, and identification information of the device. For example, in a case where the authentication fails and the print data is not able to be obtained from the storage destination, a process of stopping the printing, transmitting the transmission request of the print data to the mobile terminal device, or requesting the mobile terminal device to transmit the authentication information again or additional authentication information may be performed.

The image forming apparatus according to the exemplary embodiment further includes a unit for obtaining the print data from the mobile terminal device in a case where the data obtaining unit is not able to obtain the print data from the storage destination. For example, in a case where the print data is not able to be obtained from the storage destination, the data obtaining unit may obtain the print data by using the unit by transmitting the print data to the mobile terminal device. Examples in which the print data is not able to be obtained from the storage destination include a case where the access to the storage destination is restricted and the authentication fails. As another example, a case where the image forming apparatus is not able to obtain the data in a case where a failure occurs in the network from the image forming apparatus to the storage destination is considered.

In the image forming apparatus according to the exemplary embodiment, the data obtaining unit is connected to the network by using a communication method different from a communication method used in the obtainment of the storage destination information using the information obtaining unit, and obtains the print data. For example, in a case where the storage destination information is obtained by using a non-contact communication method (communications performed in a non-contact manner using wireless, visible light, infrared light, or sound wave), the information obtaining unit obtains the print data in a non-contact communication method (for example, wireless communication using a different communication standard) different from the aforementioned non-contact communication method or a communication method (wired communication using an optical fiber or an electrical cable) in a contact manner.

In the image forming apparatus according to the exemplary embodiment, the print data includes data stored in the mobile terminal device, and the data obtaining unit is connected to the mobile terminal device by using a communication method different from a communication method used in a case where the storage destination is connected to the network, and obtains the print data from the mobile terminal device, in a case where the print data is stored in the mobile terminal device. That is, the print data from the mobile terminal device is obtained by using a communication method different from the communication method in a case where the storage destination is connected to the network. In this case, in the mobile terminal device, the establishment of the communication with the image forming apparatus by using the communication method or the transmission of the print data to the image forming apparatus by using the communication method may be permitted by the user, or may be automatically performed.

In the image forming apparatus according to the exemplary embodiment, the information obtaining unit obtains print setting information with which a print mode of the print data is set, and the printing unit prints the print data according to the print setting information. The print setting information is information indicating a method of printing on a print medium. Specific examples of the print setting information include a setting for a sheet size, a setting for a sheet direction, a setting for the number of sheets to be printed, a setting for the number of pages to be printed on one sheet, a setting for color or monochrome printing, a setting for single-sided printing or double-sided printing, and a setting for fastening using a stapler. For example, the information obtaining unit obtains the setting information in a timing when the storage destination information is obtained (before, after, or during the storage destination information is obtained).

An image forming program according to an exemplary embodiment causes an image forming apparatus to function as an information obtaining unit, a data obtaining unit, and a printing unit. The image forming program is typically realized by controlling hardware of the image forming apparatus through cooperation between one or a plurality of application programs installed on the image forming apparatus and basic software such as an operating system. However, the image forming program may be realized by a program in another form.

The image forming apparatus according to the exemplary embodiment may be an apparatus to be used by a large number of unspecified users. The image forming apparatus is typically installed in facilities (stores such as a convenience store, private facilities such as an event venue and a hotel lobby, and public facilities) visited by a large number of unspecified users, and is set so as to be used by users other than the specific user. The usage fee may be charged or free. In the image forming apparatus to be used by a large number of unspecified users, an operating procedure of the user needs to be simplified such that the printing is able to be smoothly performed by even a user who is unfamiliar with an operation. The image forming apparatus according to the exemplary embodiment may be an apparatus to be used by a large number of specified users or a small number of specified users. Examples of the image forming apparatus include an image forming apparatus which is installed in an organization such as a company or a public organization and is used by members of such an organization.

A mobile terminal device according to an exemplary embodiment includes a selection unit and a transmission unit. The selection unit receives a user operation, and selects print data to be printed. The transmission unit transmits storage destination information of the selected print data to an image forming apparatus. The selection unit receives a user operation, and selects print data to be printed. For example, the print data may be stored in a storage destination connected to a network, and may be stored in the host device. The transmission unit transmits storage destination information of the selected print data to an image forming apparatus. A communication form in which the transmission unit transmits is not particularly limited, and various communication methods such as wireless communication, optical communication, infrared communication, and communication using sound waves may be adopted.

A mobile terminal program according to an exemplary embodiment causes a mobile terminal device to function as a selection unit and a transmission unit. The mobile terminal program is typically realized by controlling hardware of the mobile terminal device through cooperation between an application program downloaded and installed on the mobile terminal device and basic software such as an operating system or another program installed in advance on the mobile terminal device. However, the image forming program may be realized by a program in another form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
 a QR code reader that obtains storage destination information of print data managed by a mobile terminal device from the mobile terminal device; and
 a processor configured to:
  obtain the print data from a storage destination of the print data by using the storage destination information; and
  print the obtained print data,
 wherein the storage destination information includes an authentication information for an access to the storage destination in a case where the storage destination requires an authentication for the access, and
 the processor is configured to access the storage destination to obtain the print data by using the authentication information.

2. The image forming apparatus according to claim 1,
 wherein the print data includes data stored in a storage destination connected to a network accessible by the mobile terminal device, and
 the processor is connected to the network and obtains the print data from the storage destination in a case where the print data is stored in the storage destination.

3. The image forming apparatus according to claim 2, further comprising:
 a unit that obtains the print data from the mobile terminal device in a case where the processor is not able to obtain the print data from the storage destination.

4. The image forming apparatus according to claim 2,
 wherein the processor is connected to the network by using a communication method different from a communication method used in the obtainment of the storage destination information using the QR code reader, and obtains the print data.

5. The image forming apparatus according to claim 2,
 wherein the print data includes data stored in the mobile terminal device, and
 the processor is connected to the mobile terminal device by using a communication method different from a communication method used in a case where the storage destination is connected to the network, and obtains the print data from the mobile terminal device, in a case where the print data is stored in the mobile terminal device.

6. The image forming apparatus according to claim 1,
wherein the information obtaining unit obtains print setting information with which a print mode of the print data is set, and
the processor prints the print data according to the print setting information.

7. A non-transitory computer readable medium storing an image forming program that causes an image forming apparatus to function as:
a QR code reader that obtains storage destination information of print data managed by a mobile terminal device from the mobile terminal device;
a data obtaining unit that obtains the print data from a storage destination of the print data by using the storage destination information; and
a printing unit that prints the obtained print data,
wherein the storage destination information includes an authentication information for an access to the storage destination in a case where the storage destination requires an authentication for the access, and
the data obtaining unit is configured to access the storage destination to obtain the print data by using the authentication information.

8. The image forming apparatus according to claim 1,
wherein the information processing apparatus is connected to a network and obtains the print data by using a communication method different from that of using the QR code reader.

* * * * *